United States Patent [19]

Maehara et al.

[11] Patent Number: 4,867,509
[45] Date of Patent: Sep. 19, 1989

[54] APPARATUS FOR CONTROLLING BRAKE FLUID PRESSURE OF VEHICLE

[75] Inventors: Toshifumi Maehara; Takashi Sakai, both of Saitama, Japan

[73] Assignees: Akebono Brake Industry Co., Ltd., Tokyo; Akebono Research and Development Centre Ltd., Saitama, both of Japan

[21] Appl. No.: 261,201

[22] Filed: Oct. 24, 1988

[30] Foreign Application Priority Data

Nov. 6, 1987 [JP] Japan .................................. 62-279038
Aug. 4, 1988 [JP] Japan .................................. 63-193430

[51] Int. Cl.$^4$ ............................................... B60T 8/92
[52] U.S. Cl. ....................................... 303/92; 303/110; 303/114
[58] Field of Search ............... 303/92, 100, 110, 111, 303/113, 114, 115, 116, 119

[56] References Cited

U.S. PATENT DOCUMENTS 4,726,629 2/1988 Resch ..................................... 303/92

Primary Examiner—Duane A. Reger
Attorney, Agent, or Firm—Finnegan, Henderson, Farabow, Garrett, & Dunner

[57] ABSTRACT

Apparatus for controlling brake fluid pressure of a vehicle includes a hold valve provided in a first fluid passage so as to control fluid communication between a fluid pressure chamber in a master cylinder and a wheel cylinder, a decay valve provided in a second fluid passage so as to control fluid communication between a wheel cylinder and a reservoir; a supply valve provided in a third fluid passage so as to control the flow of brake fluid from a fluid pressure source to the fluid pressure chamber; an intake valve normally held in its closed position to shut off the third fluid passage, and a valve operating member mounted on the piston for movement therewith, the valve operating member being engageable with the intake valve when the stroke of movement of the piston reaches a predetermined value to thereby move the intake valve to its open position. With this construction, an anti-lock control for preventing the locking of the vehicle wheels can be effected. Further, an auxiliary piston is provided for moving the first-mentioned piston to applying a braking force when a slip of the vehicle wheels reaches a predetermined level, thereby achieving a traction control.

14 Claims, 13 Drawing Sheets

APPARATUS FOR CONTROLLING BRAKE FLUID PRESSURE OF VEHICLE

BACKGROUND OF THE INVENTION

1. Field of the Invention

This invention relates to a brake fluid pressure control apparatus for use in an anti-lock control apparatus for preventing the locking of vehicle wheels at the time of braking the vehicle and also to a brake fluid pressure control apparatus for use in both the above anti-lock control and a traction control for preventing a slip of the drive wheels at the time of starting the vehicle or accelerating it.

2. Prior Art

In an anti-lock control apparatus designed to prevent the locking of vehicle wheels at the time of braking the vehicle so as to ensure the steerability and running stability of the vehicle and to shorten the braking distance, the control modes of the brake fluid pressure (i.e., a pressure increasing mode, a pressure decreasing mode and a pressure holding mode) are determined in accordance with electrical signals from speed sensors for sensing the speed of the vehicle wheels. And, in accordance with the pressure control modes thus determined, hold valves and decay valves each in the form of a solenoid valve are opened and closed so as to increase, hold or reduce the brake fluid pressure. Such brake fluid pressure control is effected under the control of a microcomputer.

There is known a brake fluid pressure control apparatus of the type in which a fluid pressure control portion (modulator) for effecting the above-mentioned anti-lock control is incorporated in a master cylinder. In such an apparatus as disclosed in U.S. Pat. No. 4,641,895, the master cylinder comprises a primary piston and a secondary piston arranged in series, which is known as the tandem type, and brake fluid pressures in two brake lines of the brake device of the dual circuit type are controlled by the primary and secondary pistons, respectively. The above-mentioned hold valves are provided respectively in fluid passages connecting two fluid pressure chambers respectively to wheel cylinders, the fluid pressures in the two fluid pressure chambers being controlled by the primary and secondary pistons, respectively. The decay valves are provided in fluid passages connecting the wheel cylinders respectively to a reservoir.

With this construction of the above conventional apparatus, normally, the hold valves are open whereas the decay valves are closed, so that upon pressing-down of a brake pedal, the fluid pressures in the two fluid pressure chambers are supplied to the respective wheel cylinders through the respective hold valves to increase the fluid pressures in the wheel cylinders, thereby applying a braking force to the wheels. And, when the anti-lock control is started, the hold valves are closed to hold or maintain the brake fluid pressures. Further, when the decay valves are opened, with the hold valves kept closed, the brake fluids in the wheel cylinders are escaped to the reservoir through the decay valves, so that the fluid pressures in the wheel cylinders are reduced, thereby reducing the braking force. Also, in the pressure increasing mode of the anti-lock control, the hold valves are operated into the open condition, and the pistons are operated by the brake fluid of high pressure supplied from a fluid pressure source such as an accumulator to thereby increase the fluid pressures in the wheel cylinders.

However, if any malfunction should develop in the fluid pressure source system, e.g., a fluid pressure pump, during the anti-lock control, the braking force becomes inadequate. To compensate for this, the brake pedal has to be further pressed down, so that the brake pedal can not be still further pressed down adequately (that is, there is no sufficient room for further pressing-down).

Another difficulty is that during the normal braking operation in which the anti-lock control is not effected, when vapor lock occurs in the brake fluid line due to the overheating of the brake device, a sufficient braking force can not be achieved even if the brake pedal is fully pressed down.

Further, in the case where in addition to the above-mentioned anti-lock control, the above brake fluid pressure control apparatus is designed to perform a traction control, the brake fluid of high pressure of the fluid pressure source as in the anti-lock control acts on the pistons, the braking force becomes excessive. This not only imparts vibration to the vehicle body to provide an uncomfortable ride but also to apply an undesirable load to the drive system.

SUMMARY OF THE INVENTION

It is therefore an object of this invention to provide an anti-lock control apparatus which can secure a predetermined braking force even if the fluid pressure source system is subjected to malfunction during the anti-lock control.

Another object is to provide an anti-lock control apparatus which can secure a required braking force even if the fluid pressure source system is subjected to malfunction during the anti-lock control, and can prevent the braking force from becoming insufficient due to the development of the vapor lock, etc., during the time when the anti-lock control is in its OFF state (normal control).

A further object is to provide an anti-lock and traction control apparatus which can secure a required braking force even if the fluid pressure source system is subjected to malfunction during the anti-lock control, and can set a desired fluid pressure required for the traction control.

According to the invention, there is provided apparatus for controlling brake fluid pressure of a vehicle comprising:

(a) a master cylinder comprising a housing having at least one fluid pressure chamber therein, and at least one piston movably mounted within the housing so as to control fluid pressure within the fluid pressure chamber, the housing having a valve chamber which opens to the fluid pressure chamber;

(b) a fluid pressure source for supplying brake fluid;

(c) a reservoir for holding the brake fluid;

(d) a wheel cylinder for applying a braking force to wheels of the vehicle;

(e) a first fluid passage connecting the fluid pressure chamber to the wheel cylinder;

(f) a hold valve provided in the first fluid passage so as to control fluid communication between the fluid pressure chamber and the wheel cylinder;

(g) a second fluid passage connecting the wheel cylinder to the reservoir;

(h) a decay valve provided in the second fluid passage so as to control fluid communication between the wheel cylinder and the reservoir;

(i) a third fluid passage connecting the fluid pressure source to the fluid pressure chamber, the valve chamber being provided in the third fluid passage;

(j) a supply valve provided in the third fluid passage between the valve chamber and the fluid pressure source so as to control the flow of the brake fluid from the fluid pressure source to the fluid pressure chamber;

(k) at leas one intake valve mounted in the valve chamber and normally held in its closed position to shut off the third fluid passage;

(1) a valve operating member mounted on the piston for movement therewith, the valve operating member being engageable with the intake valve when the stroke of movement of the piston reaches a predetermined value to thereby move the intake valve to its open position.

BRIEF DESCRIPTION OF THE DRAWINGS

FIG. 13; and

DESCRIPTION OF THE PREFERRED EMBODIMENTS OF THE INVENTION

The invention will now be described with reference to the drawings.

Figure 1:
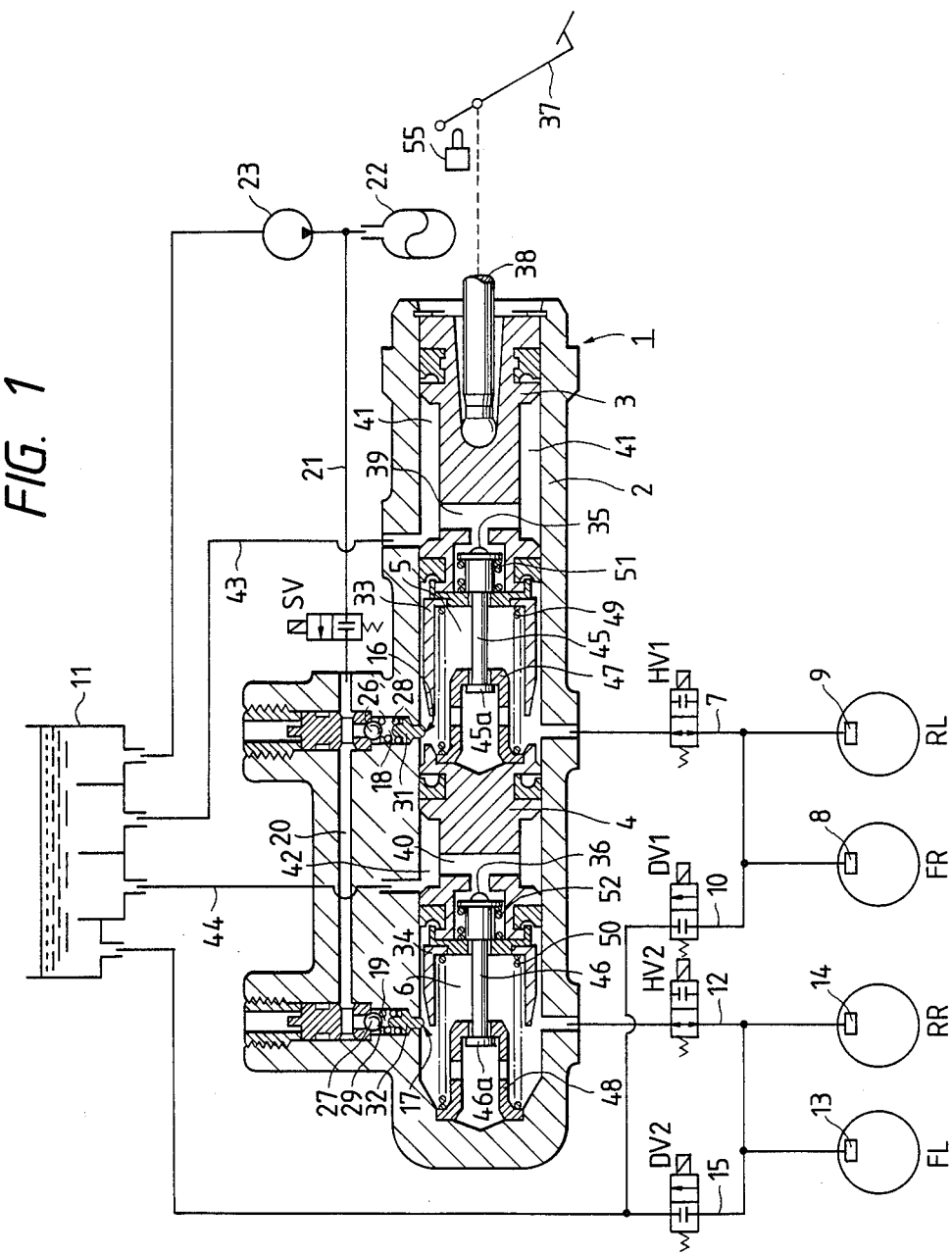
FIG. 1 is a view of the overall construction of a brake fluid pressure control apparatus according to a first embodiment of the invention, cross-sectionally showing a main portion thereof.

FIG. 1 shows a first embodiment of the invention, that is, a brake fluid pressure control apparatus for the anti-lock control for use in a dual circuit brake device of the cross line-type (X-line type). A master cylinder 1 of the tandem type comprises a primary piston 3 and a secondary piston 4 both of which are mounted within a master cylinder housing 2. The housing 2 has fluid pressure chambers 5 and 6 of which fluid pressures are controlled by the pistons 3 and 4, respectively.

The fluid pressure chamber 5 of which fluid pressure is controlled by the primary piston 3 is connected to a wheel cylinder 8 of a right front wheel FR and a wheel cylinder 9 of a left rear wheel RL through a fluid passage 7 in which a hold valve HV1 in the form of a normally open-type solenoid valve is provided. The wheel cylinders 8 and 9 are connected to a reservoir 11 through a fluid passage 10 in which a decay valve DV1 in the form of a normally closed-type is provided.

Similarly, the fluid pressure chamber 6 of which fluid pressure is controlled by the secondary piston 4 is connected to a wheel cylinder 13 of a left front wheel FL and a wheel cylinder 14 of a right rear wheel RR through a fluid passage 12 in which a hold valve HV2 in the form of a normally open-type solenoid valve is provided. The wheel cylinders 13 and 14 are connected to the reservoir 11 through a fluid passage 15 in which a decay valve DV2 in the form of a normally closed-type is provided.

Valve chambers 18 and 19 are formed in the housing 2 of the master cylinder 1 and have openings 16 and 17, respectively, which open to the fluid pressure chambers 5 and 6, respectively. The valve chambers 18 and 19 are connected together through a fluid passage 20 formed in the housing 2 and are connected to an accumulator 22 through a fluid passage 21 in which a supply valve SV of a normally closed type solenoid valve is provided. The accumulator 22 is connected to the pressure side of a fluid pressure pump 23, and the suction side of the fluid pressure pump 23 is connected to the reservoir 11. The accumulator 22 serves to always hold fluid pressure of a constant level by means of the pump 23. Check valves 26 and 27 are mounted within the valve chambers 18 and 19, respectively, so as to prevent the brake fluid from flowing back from the fluid pressure chambers 5 and 6 toward the fluid passage 21. Also, intake valves 31 and 32 are received respectively in the openings 16 and 17 of the valve chambers 18 and 19 and are urged by respective springs 28 and 29 to normally close the respective openings 16 and 17 which open to the fluid pressure chambers 5 and 6, respectively. The front or inner ends of the intake-valves 31 and 32 project into the fluid pressure chambers 5 and 6, respectively.

Cylindrical intake sleeves 33 and 34 serving to operate the intake valve 31 and 32 are fixed to the primary and secondary pistons 3 and 4, respectively, and disposed in the fluid pressure chambers 5 and 6, respectively. The primary and secondary pistons 3 and 4 contain respective center valves 35 and 36 which are movable relative to the primary and secondary pistons 3 and 4, respectively, along the axis of the master cylinder 1. When a brake pedal 37 is not pressed down, so that a push rod 38 does not push the primary piston 3 as shown in FIG. 1, the fluid pressure chambers 5 and 6 communicate with the reservoir 11 through the respective center valves 35 and 36 which are in their open positions, respective communication passages 39 and 40 formed respectively through the pistons 3 and 4, respective annular chambers 41 and 42 each defined by the inner peripheral wall of the housing 2 and a respective one of the outer peripheries of the pistons 3 and 4, and respective fluid passages 43 and 44. Upon pressing-down of the brake pedal 37, the push rod 38 is operated to move the primary piston 3, so that the center valve 35 is brought into its closed position, thereby interrupting the fluid communication between the fluid pressure chamber 5 and the reservoir 11. As a result, the fluid pressure within the fluid pressure chamber 5 increases, so that the brake fluid in the fluid pressure chamber 5 is supplied to the wheel cylinders 8 and 9 through the hold valve HV1 in the open condition, thereby braking the wheels FR and RL of one braking line. And, the increase in the fluid pressure within the fluid pressure chamber 5 causes the secondary piston 5 to move, so that the center valve 36 is brought into its closed position, thereby interrupting the fluid communication between the fluid pressure chamber 6 and the reservoir 11. As a result, the fluid pressure within the fluid pressure chamber 6 also increases, so that the brake fluid in the fluid pressure chamber 6 is supplied to the wheel cylinders 13 and 14 through the hold valve HV2 in the open condition, thereby braking the wheels FL and RR of the other braking line.

These operations are achieved by the provision of stems 45 and 46 having at their one ends the center valves 35 and 36, respectively, stop bushings 47 and 48 engaging with heads 45a and 46a on the other ends of the stems 45 and 46, respectively, compression springs 49 and 50 acting between the stop bushing 47 and the intake sleeve 33 and between the stop bushing 48 and the intake sleeve 34, respectively, and compression springs 51 and 52 urging the center valves 35 and 36 into their respective closed positions. Then, when the primary and secondary pistons 3 and 4 are further moved in a left-hand direction (FIG. 1), the intake sleeves 33 and 34 are brought into engagement with the intake valves 31 and 32, respectively, to move them upwardly, so that if the supply valve SV is in its open condition, the brake fluid of high pressure is supplied from the accumulator 22 to the fluid pressure chambers 5 and 6. A bottoming switch 55 is provided for detecting the stroke of movement of the brake pedal 37, and when the stroke of movement of the brake pedal 37 exceeds a predetermined value, the bottoming switch 55 is actuated, and the supply valve SV is responsive to the actuation of the bottoming switch 55 to be opened to enable the fluid communication through the fluid passage 21.

Figure 2:
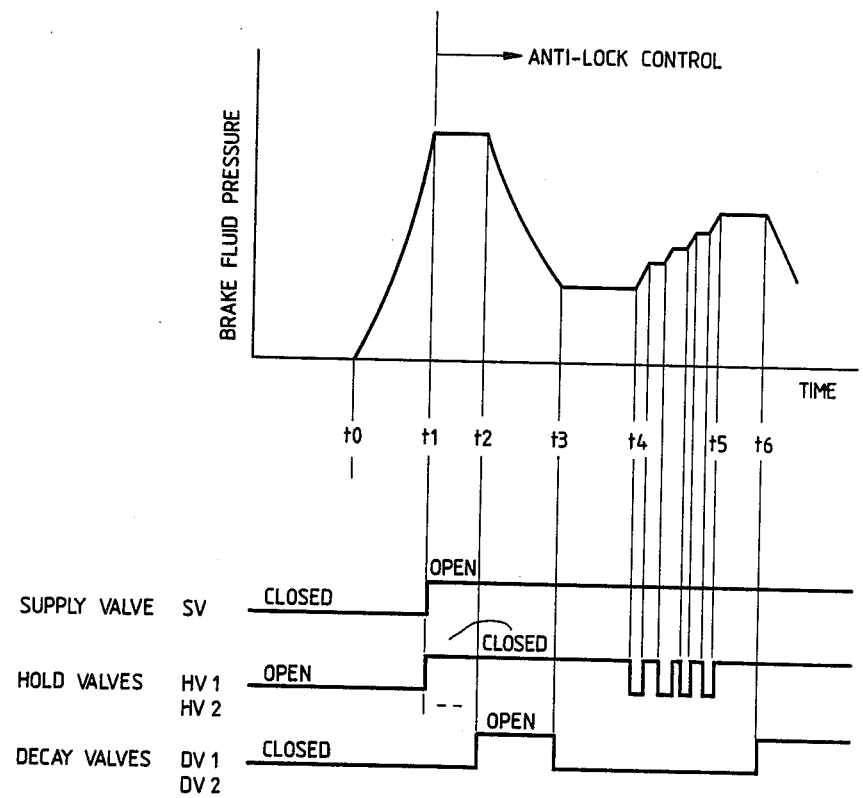
FIG. 2 is a diagrammatical illustration showing an anti-lock control effected by the apparatus of FIG. 1.
Figure 3:
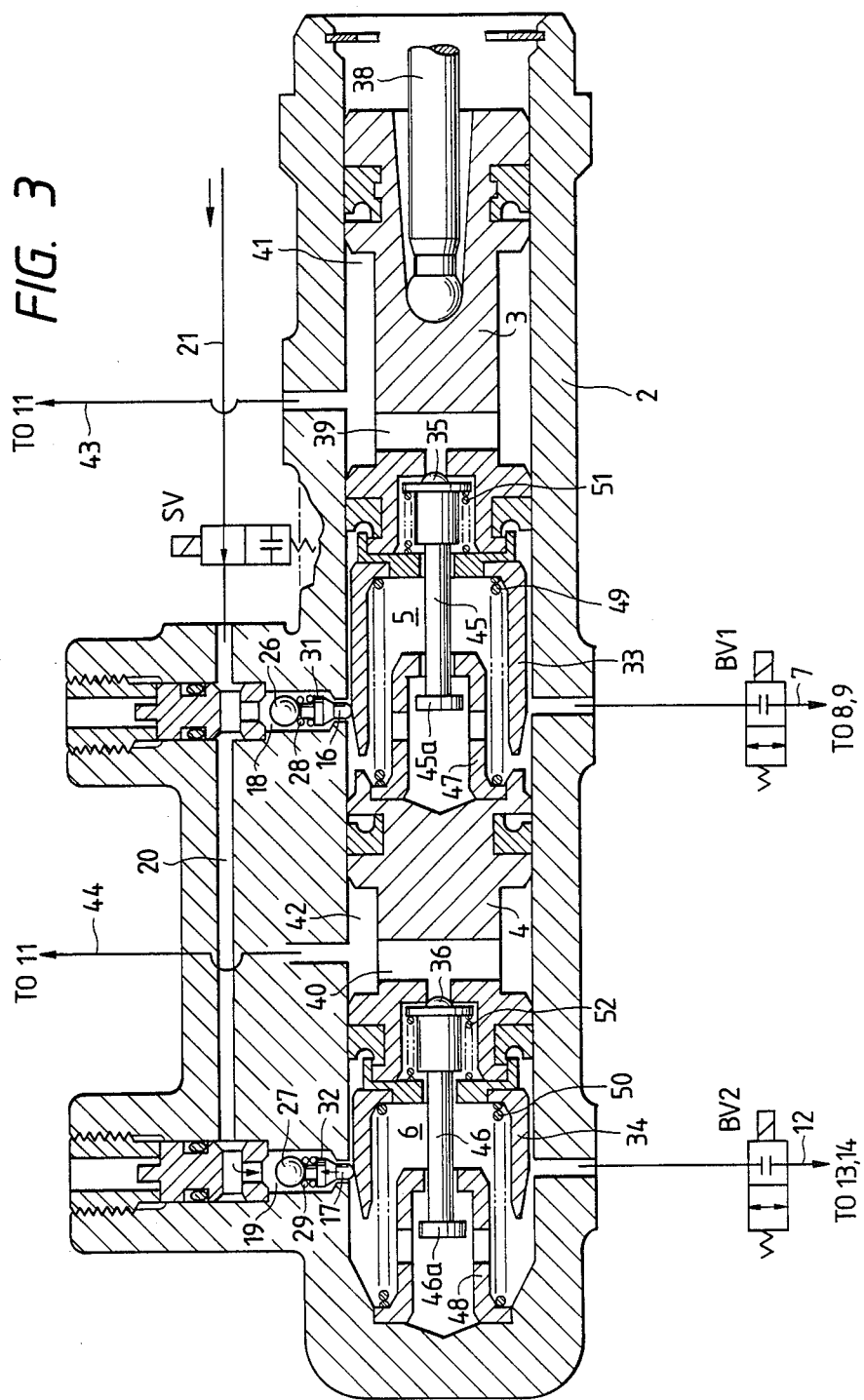
FIG. 3 is a view similar to FIG. 1, showing the operation of the apparatus.

The brake fluid pressure control apparatus according to the first embodiment of this invention is of the above-mentioned construction, and its operation will now be described with reference to FIGS. 1 to 3. FIG. 2 is a diagrammatical illustration showing a variation in the brake fluid pressure at the time of the normal braking operation and subsequent anti-lock control, as well as the conditions of the supply valve SV, the hold valves HV1 and HV2 and the decay valves DV1 and DV2. FIG. 3 shows the condition of the apparatus in which when the strokes of the pistons 3 and 4 exceed the respective predetermined values during the anti-lock control, the intake sleeves 33 and 34 are brought into engagement with the intake valves 31 and 32, respectively, to open these valves, so that the brake fluid of high pressure is supplied to the fluid pressure chambers 5 and 6 from the accumulator 22.

Actually, although the fluid pressures in the two brake lines of the dual circuit brake device are controlled independently of each other, the operation will be described here, assuming that the two brake lines are simultaneously operated for the sake of brevity.

(A) Normal Braking Operation (from time t0 to time t1 in FIG. 2)

When the brake pedal 37 is pressed down with the supply valve SV closed, the hold valves HV1 and HV2 open and the decay valves DV1 and DV2 closed, as shown in FIG. 1, the primary piston 3 is pushed by the push rod 38 in the left-hand direction (FIG. 1) to close the center valve 35, so that the secondary piston is also moved in the left-hand direction to close the center valve 36. As a result, the fluid pressures develop in the fluid pressure chambers 5 and 6 and are supplied to the wheel cylinders 8, 9, 13 and 14 to effect the braking operation.

At this time, if the vapor lock develops due to the overheating of the brake fluid, the brake pedal 37 will be pressed down deeply, so that the intake sleeves 33 and 34 push the intake valves 31 and 32 upwardly, respectively, and at the same time the bottoming switch 55 is actuated to open the supply valve SV. As a result, the accumulator 22 replenishes the fluid pressure chambers 5 and 6 with the fluid pressure to thereby secure the braking force.

(B) Anti-lock Control

When it is detected that the system or line speed (the wheel speed of each brake line to be controlled, for example, the select-low speeds of the right front and left rear wheels FR and RL) is decelerated beyond a predetermined level due to the increase in the fluid pressures in the wheel cylinders 8, 9, 13 and 14, a control circuit (not shown) which comprises a microcomputer feeds a holding signal. From this time, that is, time t1, the anti-lock control is started.

(1) Holding Mode (from time t1 to time t2 in FIG. 2)

At time t1 (FIG. 2), the supply valve SV is opened, so that the fluid pressure is supplied from the accumulator 22 to the valve chambers 18 and 19. Also, the hold valves HV1 and HV2 are closed to interrupt the communication between the fluid pressure chamber 5 and the wheel cylinders 8 and 9 through the fluid passage 7 as well as the communication between the fluid pressure chamber 6 and the wheel cylinders 13 and 14 through the fluid passage 12. As a result, the fluid pressures within the wheel cylinders 8, 9, 13 and 14 are held or maintained. In this case, as shown in FIG. 3, the primary and secondary pistons 3 and 4 are so positioned that the intake sleeves 33 and 34 push the intake valves 31 and 32 upwardly, respectively, so that the fluid pressure chambers 5 and 6 are in communication with the accumulator 22. As a result, by means of the fluid pressure supplied from the accumulator 22 to the fluid pressure chambers 5 and 6, the pistons 3 and 4 are returned to such positions that the intake valves 31 and 32 close the openings 16 and 17, respectively. Therefore, even if a malfunction develops in the fluid pressure source system during the control, sufficient fluid pressure is held within the fluid pressure chambers 5 and 6. If the anti-lock control is started before the intake valves 31 and 32 are opened, the pistons 3 and 4 are remain stationary as they are, and in a later pressure increasing mode (from time t4 to time t5 in FIG. 2) of the anti-lock control, the pistons 3 and 4 are moved until the intake valves 31 and 32 are opened, thereby supplying the fluid pressure from the accumulator 22 to the fluid pressure chambers 5 and 6.

(2) Pressure Decreasing Mode (from time t2 to time t3 in FIG. 2)

When the above-mentioned system speed is further lowered, the decay valves DV1 and DV2 are opened from time t2, so that the brake fluids within the wheel cylinders 8, 9, 13 and 14 flow into the reservoir 11 through the fluid passages 10 and 15 to decrease the fluid pressures within these wheel cylinders.

(3) Holding Mode (from time t3 to time t4 in FIG. 2)

At time t3 when the above-mentioned system speed begins to recover from its low peak value because of the above decrease of the brake fluid pressure, the decay valves DV1 and DV2 are closed to again put the control in the holding mode.

(4) Pressure Increasing Mode (From time t4 to time t5 in FIG. 2)

When the above-mentioned system speed reaches its high peak value, the hold valves HV1 and HV2 are opened, so that the fluid pressure within the accumulator 22 is supplied to the wheel cylinders 8, 9, 13 and 14 through the fluid pressure chambers 5 and 6. In the pressure increasing mode which is started from time t4 in FIG. 2, the hold valves HV1 and HV2 are alternately opened and closed at short time intervals, so that the brake fluid pressures are increased in a step-like manner.

(5) Holding Mode (from time 5 to time 6 in FIG. 2)

When the above-mentioned system speed begins to be lowered because of the increase of the brake fluid pressure, the control is again put in the holding mode, so that the hold valves HV1 and HV2 are closed. Then, at time T6, the decay valves DV1 and DV2 are opened to again put the control in the pressure decreasing mode.

The first embodiment of the invention now becomes apparent from the foregoing description. In this embodiment, there are provided the fluid pressure passages 20 and 21 connecting the fluid pressure chambers 5 and 6 to the accumulator 22, the supply valve SV which is provided in the fluid passage 21 and is opened at the time of the anti-lock control, the intake valves 31 and 32 which are received respectively in the openings 16 and 17, opening to the fluid pressure chambers 5 and 6 and leading to the fluid passages 20 and 21, and normally close the openings 16 and 17, respectively, and the intake sleeves 33 and 34 which are mounted respectively on the pistons 3 and 4 for movement therewith and are brought into engagement respectively with the intake valves 31 and 32 when the strokes of the pistons 3 and 4 reach the predetermined values to thereby open the intake valves 31 and 32. The intake valves 31 and 32 are opened in response to the movements of the pistons 3 and 4, respectively, so that the brake fluid of high pressure is supplied to the fluid pressure chambers 5 and 6 from the accumulator 22. As a result, the pistons 3 and 4 are pushed back and maintained in their predetermined positions, thereby securing a sufficient room for further pressing-down of the brake pedal 37. Therefore, even if any malfunction develops in the fluid pressure source system during the anti-lock control, the fluid pressure proportional to the degree of pressing-down of the brake pedal 37 can be supplied to the wheel cylinders 8, 9, 13 and 14.

In addition, there is also provided the bottoming switch 55 which is actuated to open the supply valve SV when the amount of pressing-down (i.e., the stroke of movement) of the brake pedal 36 exceeds the predetermined value. Therefore, even if the brake force becomes insufficient due to the development of vapor lock in the brake fluid pressure system or the like, both the supply valve SV and the intake valves 31 and 32 are opened by pressing down the brake pedal 36 deeply, so that the brake fluid of high pressure is supplied to the fluid pressure chambers 5 and 6 from the accumulator 22, thereby securing a required braking force. In this embodiment, although the bottoming switch 55 is so positioned as to detect the predetermined stroke of movement of the brake pedal 37, this switch may be provided in such a position as to detect a predetermined stroke of movement of the primary piston 3.

The first embodiment of the invention described above is the fluid pressure control apparatus used exclusively for the purpose of the anti-lock control for preventing the locking of the vehicle wheels when braking the vehicle. A second embodiment of the invention to be described below is a modified apparatus which in addition to the above anti-lock control, can effect a traction control so as to prevent a slip of the drive wheels at the time of starting the vehicle or accelerating it, thereby improving the starting and acceleration as well as running stability of the vehicle.

The second embodiment of the invention will now be described with reference to FIGS. 4 to 6. The main portion of this embodiment is of the same construction as that of the first embodiment of FIGS. 1 to 3. Therefore, those parts of the second embodiment identical to those of the first embodiment will be denoted by the same reference numerals and characters, and those parts of the second embodiment which perform the same functions as the corresponding parts of the first embodiment but are slightly different therefrom in construction will be designated by identical reference numerals each having a dash (') affixed thereto. Explanation of the same parts will be omitted, and only the different parts as well as the traction control will be described.

Figure 4:
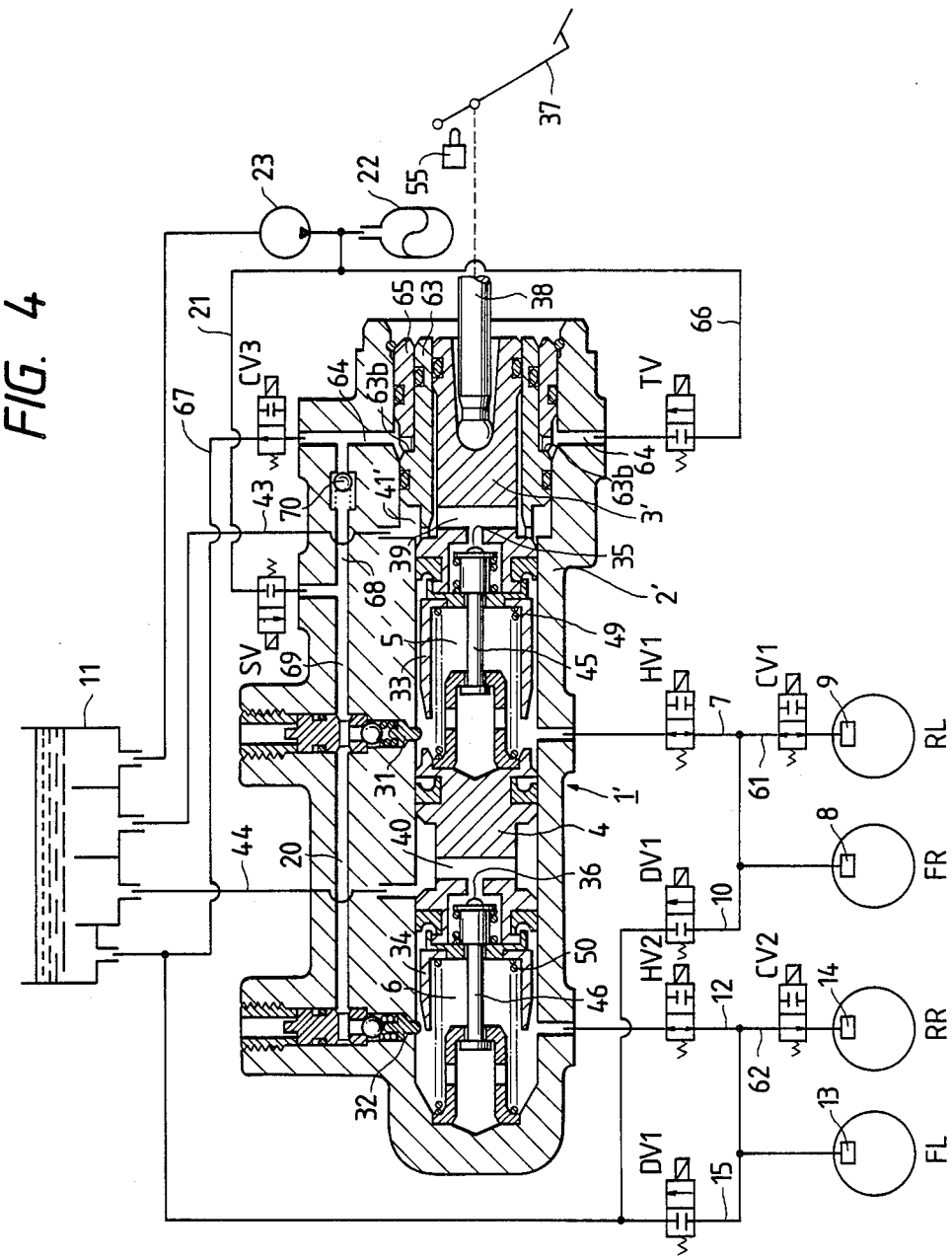
FIG. 4 is a view similar to FIG. 1 but showing a second embodiment of the invention.

In this embodiment, as is clear from FIG. 4, cut valves CV1 and CV2 each in the form of a normally open-type solenoid valve are provided respectively in fluid passages 61 and 62 branched off from fluid passages 7 and 12 and connected to wheel cylinders 9 and 14 of a left rear wheel RL and right rear wheel RR (in the case of the front wheel drive), respectively. An auxiliary piston 63 of a cylindrical shape is mounted in an annular chamber 41' defined by an inner peripheral surface of a housing 2' of a master cylinder 1' and an outer periphery of a primary piston 3', the auxiliary piston 63 being mounted around the primary piston 3' in coaxial relation thereto and being slidable relative to both the housing 2' and the primary piston 3'. A projection 63a on the left-hand end of the auxiliary piston 63 is held against the primary piston 3'. The auxiliary piston 63 has an annular stepped portion or shoulder 63b intermediate opposite ends thereof and facing in a right-hand direction (FIGS. 4 and 6) so as to receive pressure. An auxiliary fluid pressure chamber 64 is formed on the right-hand side of the stepped portion 63b. Reference numeral 65 denotes a plug which closes the auxiliary fluid pressure chamber 64 and serves to limit the movement of the auxiliary piston 63 in the right-hand direction. The auxiliary fluid pressure chamber 64 is connected to an accumulator 22 through a fluid passage 66 in which a traction valve TV in the form of a normally closed type solenoid valve is provided. Also, the auxiliary fluid pressure chamber 64 is connected to a reservoir 11 through a fluid passage 67 in which a cut valve CV3 in the form of normally open-type solenoid valve is provided. Furthermore, the auxiliary fluid pressure chamber 64 is connected via a fluid passage 68, formed in the housing 2', to a fluid passage 69 connecting a supply valve SV to a valve chamber 18. Provided in the fluid passage 68 is a check valve 70 for preventing the brake fluid from flowing from the fluid passage 69 to the auxiliary fluid pressure chamber 64.

In the brake fluid pressure control apparatus of FIG. 4, at the time of the normal braking operation and the anti-lock control, the traction valve TV is closed, and the cut valve CV3 is opened. And, because of the provision of the check valve 70 in the fluid passage 68, it will be apparent that the apparatus of FIG. 4 performs the same function as the apparatus of FIG. 1 does at the time of the normal braking operation and the anti-lock control.

(C) Traction Control

In the case of the traction control for preventing a slip of the drive wheels FR and FL at the time of starting the vehicle or accelerating it, the pressure increasing mode is started from the time (time t11 in FIG. 5) when a control circuit (not shown) which comprises a microcomputer detects a slip of the drive wheels FR and FL.

Figure 5:
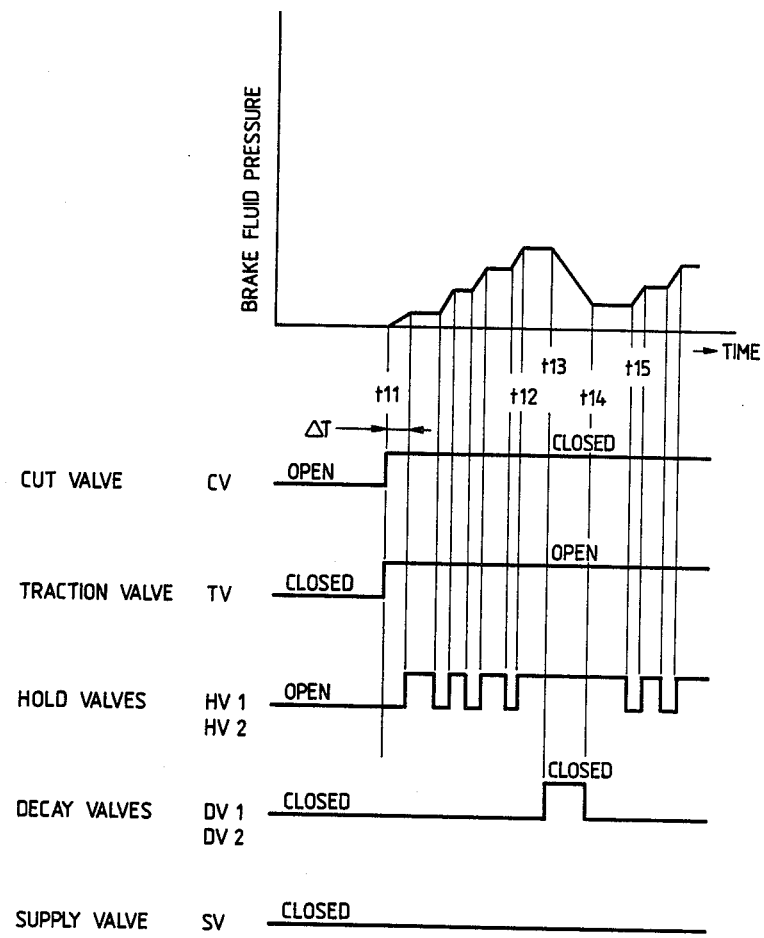
FIG. 5 is a diagrammatical illustration showing a traction control effected by the apparatus of FIG. 4.
Figure 6:
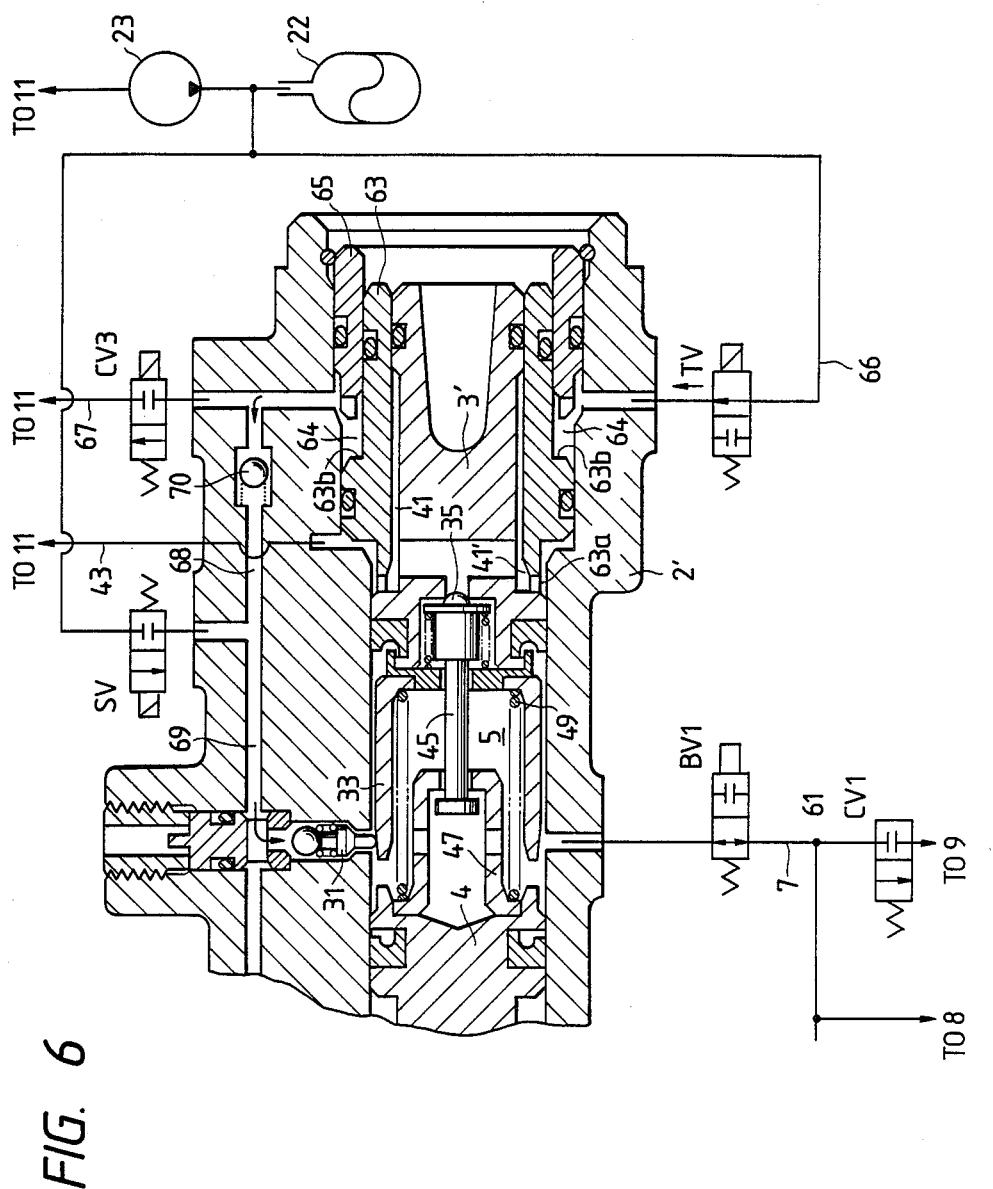
FIG. 6 is a view similar to FIG. 4 showing the operation of the apparatus of FIG. 4.
Figure 7:
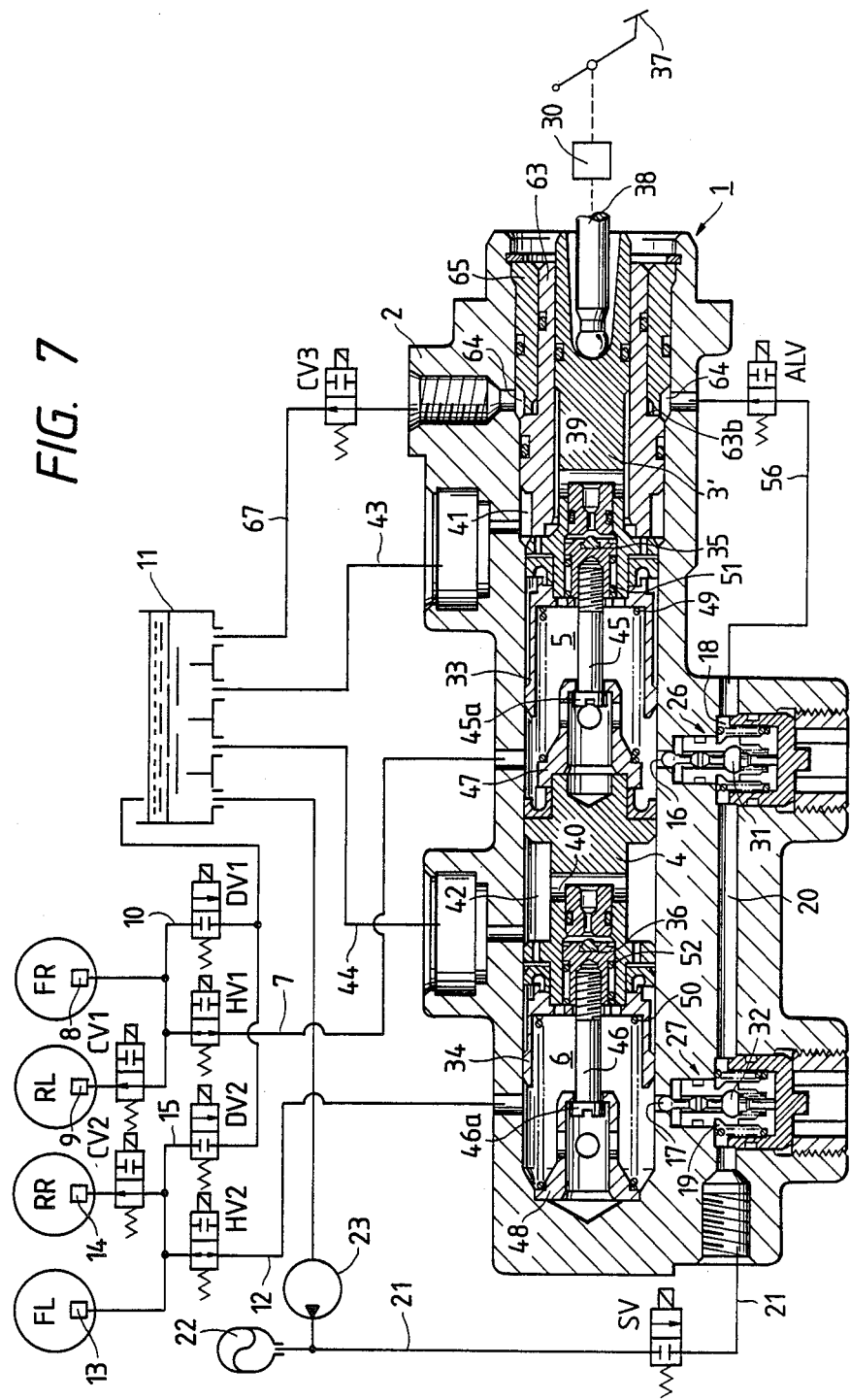
FIG. 7 is a view similar to FIG. 1 but showing a third embodiment of the invention.

(1) Pressure Increasing Mode (from time t11 to time t12 in FIG. 5; FIG. 6)

At time t11 (FIG. 5), the cut valves CV1, CV2 and CV3 are closed, and the traction valve TV is opened. Therefore, the communication between the fluid pressure chamber 5 (main fluid pressure chamber) of the master cylinder 1' and the wheel cylinder 9 for the driven wheel RL, the communication between the fluid pressure chamber 6 (another main fluid pressure chamber) of the master cylinder 1' and the wheel cylinder 14 for the driven wheel RR, and the communication between the auxiliary fluid pressure chamber 64 and the reservoir 11 are interrupted. Also, since the auxiliary fluid pressure chamber 64 is caused to communicate with the accumulator 22, the pressure within the auxiliary fluid pressure chamber 64 is increased, so that the auxiliary piston 63 is moved in the left-hand direction (FIG. 4). As a result, the primary piston 3' is urged by the auxiliary piston 63 to be moved in the left-hand direction, as shown in FIG. 6, so that the brake fluids within the wheel cylinders 8 and 13 are increased to put the control in the pressure increasing mode. During a predetermined time period ΔT after the initiation (time t11) of the traction control, the hold valves HV1 and HV2 are held in their open conditions, and during this time period a preliminary pressure increasing is effected, and then the hold valves HV1 and HV2 are closed to hold or maintain the brake fluid pressures. Thereafter, the hold valves HV1 and HV2 are alternately opened and closed at short time intervals, so that the brake fluid pressures are increased in a step-like manner.

(2) Holding Mode (from time t12 to time t13 in FIG. 5)

From time t12 when the slip of the drive wheels FR and FL becomes less, the hold valves HV1 and HV2 are closed to put the control in the holding mode.

(3) Pressure Decreasing Mode (from time t13 to time t14 in FIG. 5)

From time t13, the decay valves DV1 and DV2 are opened to put the control in the pressure decreasing mode, and thereafter each mode is repeated as in the anti-lock control.

The pressure-receiving annular stepped portion 63b of the auxiliary piston 63 receives the fluid pressure in the auxiliary fluid pressure chamber 64 which fluid pressure is equal to the fluid pressure accumulated in the accumulator 22. And, the area of the primary piston 3' which receives the fluid pressure in the fluid pressure chamber 5 is substantially equal to the cross-sectional area of the fluid pressure chamber 5. Therefore, the fluid pressure $P_M$ within the fluid pressure chamber 5 in the closed condition of an intake valve 31 is represented by the following formula:

$$P_M = A_B/A_M \times P_A$$

where $A_M$ represents the pressure receiving area of the primary piston 3', $A_B$ represents the pressure receiving area of the auxiliary piston 63, and $P_A$ represents the fluid pressure in the accumulator 22.

More specifically, the fluid pressure $P_M$ within the fluid pressure chamber 5 can be determined by the pressure receiving ratio of $A_B/A_M$. Therefore, if this ratio is set to less than 1, then the maximum fluid pressure applied to the wheel cylinders 8 and 13 is less than the fluid pressure $P_A$ in the accumulator 22, which can prevent vibration of the vehicle, which would be caused by the application of an excessive brake fluid at the time of the traction control, thereby enabling the smooth traction control and preventing an excessive load from being applied to the drive system.

A third embodiment of the invention will now be described with reference to FIGS. 7 to 14. Those parts of the third embodiment basically the same as those of the first and second embodiments will be denoted by the same reference numerals and characters, and explanation of such same parts will be omitted. An auxiliary fluid pressure chamber 64 is connected to a valve chamber 18 through a fluid passage 56 in which there is provided an anti-lock valve ALV in the form of a normally open-type solenoid valve which is closed only at the time of a traction control. Therefore, the auxiliary fluid pressure chamber 64 is adapted to be supplied with a pressurized brake fluid from an accumulator 22 through a fluid passage 21 and a fluid passage 20 communicating the valve chamber 18 with a valve chamber 19. A supply valve SV is provided in the fluid passage 21. Also, the auxiliary fluid pressure chamber 64 is connected to a reservoir 11 through a fluid passage 67 in which there is provided a traction control valve CV3 in the form of a normally open-type solenoid valve which is closed only at the time of the traction control.

As described above, the anti-lock valve ALV of the normally open type is provided in the fluid passage 56, connected to the auxiliary fluid pressure chamber 64, and is closed only at the time of the anti-lock control so as to shut off the fluid passage leading to the reservoir 11 through the valve chambers 19 and 18 and the auxiliary fluid pressure chamber 64. The fluid passage 56 is connected to the fluid passages 20 and 21 which connect fluid pressure chambers 5 and 6 to the accumulator 22. The auxiliary fluid pressure chamber 64 is connected to the reservoir 11 through the fluid passage 67 in which there is provided the traction valve CV3 of the normally open type which is closed only at the time of the traction control. With this arrangement, except at the time of the anti-lock control and the traction control, the pressures within the valve chambers 18 and 19 and the auxiliary fluid pressure chamber 64 are the atmospheric pressure, and except at the time of the anti-lock control and the traction control, the fluid pressure will not remain in the fluid passage extending from the supply valve SV to the traction valve CV3 via the anti-lock valve ALV.

Reference numeral 30 denotes a booster of the known type to assist the pedal pressing force.

Figure 8:
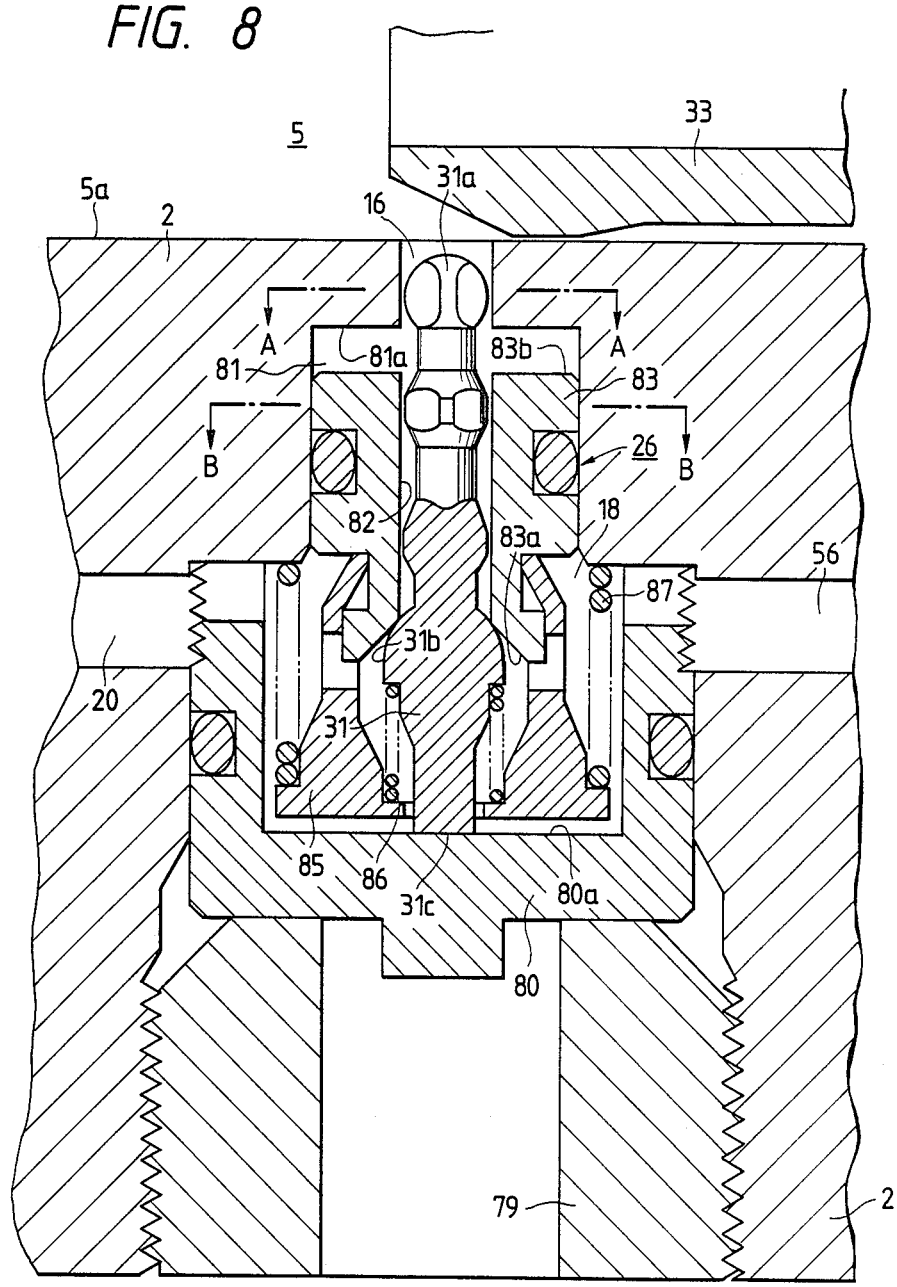
FIG. 8 is an enlarged, cross-sectional view of a valve mechanism of the apparatus of FIG. 7.

FIG. 8 shows the cross-section of a valve mechanism 26 on an enlarged scale. The valve chamber 18 is formed by a cup-shaped stop member 80 which is mounted within a housing 2 and is secured thereto by a set screw 79. A piston chamber 81 is provided adjacent to an opening 16 opening to the fluid pressure chamber 5 and is disposed coaxially with the opening 16. A piston 83 serving as a valve holding member is received in the piston chamber 81 for sliding movement in a direction perpendicular to the inner peripheral surface 5a of the fluid pressure chamber 5, the piston 83 having a central bore 82 formed axially therethrough. The tapered or conical valve seat 83a is formed on the surface of the central bore 82 at one end thereof remote from the opening 16.

Figure 9:
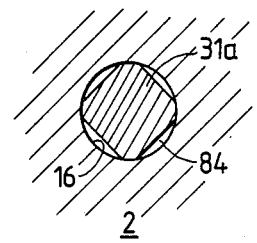
FIG. 9 is a cross sectional view taken along the line A—A of FIG. 8.
Figure 10:
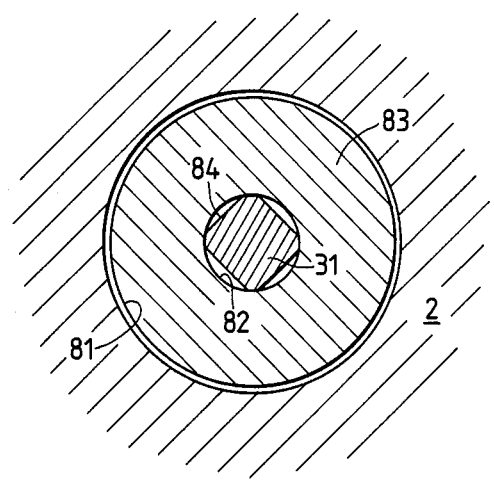
FIG. 10 is a cross-sectional view taken along the line B—B of FIG. 8.

An intake valve 31 takes the form of a bar-like poppet valve and slidably extends through the central bore 82 of the piston 83, the intake valve 31 being, able to slidably extend through the opening 16. The intake valve 31 is movable along its axis in such a manner that its front end 31a can be extended into and retracted from the fluid pressure chamber 5. The intake valve 31 has a semi-spherical valve portion 31b adapted to seat on the valve seat 83a of the piston 83. The front end 31a of the intake valve 31 as well as a portion of its shank is generally square in cross-section, as shown in FIGS. 9 and 10. The four corners of the front end 31a of the intake valve 31 and the four corners of that portion of the shank serve as supporting portions and are disposed in sliding contact with the inner peripheral surface of the opening 16 and the inner peripheral surface of the central bore 82, respectively. With this arrangement, when an intake sleeve 33 is brought into engagement with the intake valve 31 to push it down, the intake valve 31 is prevented from being tilted and being brought into frictional contact with the surfaces of the opening 16 and the central bore 82 of the piston 83. Thus, the downward movement of the intake valve 31 is effected smoothly. By virtue of the provision of the generally cross-sectionally square front end 31a of the intake valve 31 and the generally cross-sectionally square portion of its shank, fluid passages 84 are formed around the outer periphery of the intake valve 31.

A spring holder 85 is fixedly secured to the piston 83, and a check spring 86 extends between the intake valve 31 and the spring holder 85 to urge the valve portion 31b of the intake valve 31 into sealing engagement with the valve seat 83a on the piston 83. The piston 83 is urged away from the opening 16 by means of a set spring 87 extending between the spring holder 85 and a surface of the valve chamber 18. The spring force of the set spring 87 is greater than that of the check spring 86. In that position of the intake valve 31 where a rear end face 31c of the intake valve 31 is held against the inner surface 80a of the stop member 80, the piston 83 is held in the position shown in FIG. 8 under the influence of the set spring 87.

The set spring 87 also serves to urge the valve seat 83a of the piston 83 against the valve portion 31b of the intake valve 31. More specifically, as is clear from FIG. 7, except at the time of the anti-lock control and the traction control, the supply valve SV is closed, and the anti-lock valve ALV and the traction valve CV3 are both opened. Therefore, the fluid pressure is not applied to the valve chamber 18, so that an end face 83b of the piston 83 is spaced from a surface 81a of the piston chamber 81, and the front end 31a of the intake valve 31 is fully received within the opening 16. Therefore, during the normal braking operation, the intake sleeve 33 will not be brought into engagement with the front end 31a of the intake valve 31. Then, upon pressing-down of a brake pedal 37, a primary piston 3 is moved to increase the fluid pressure within the fluid pressure chamber 5, so that this fluid pressure is applied to the end face 83b of the piston 83. As a result, because of this fluid pressure force, the valve seat 83a of the piston 83 is further pressed against the valve portion 31b of the intake valve, thereby enhancing function of a seal therebetween.

Figure 11:
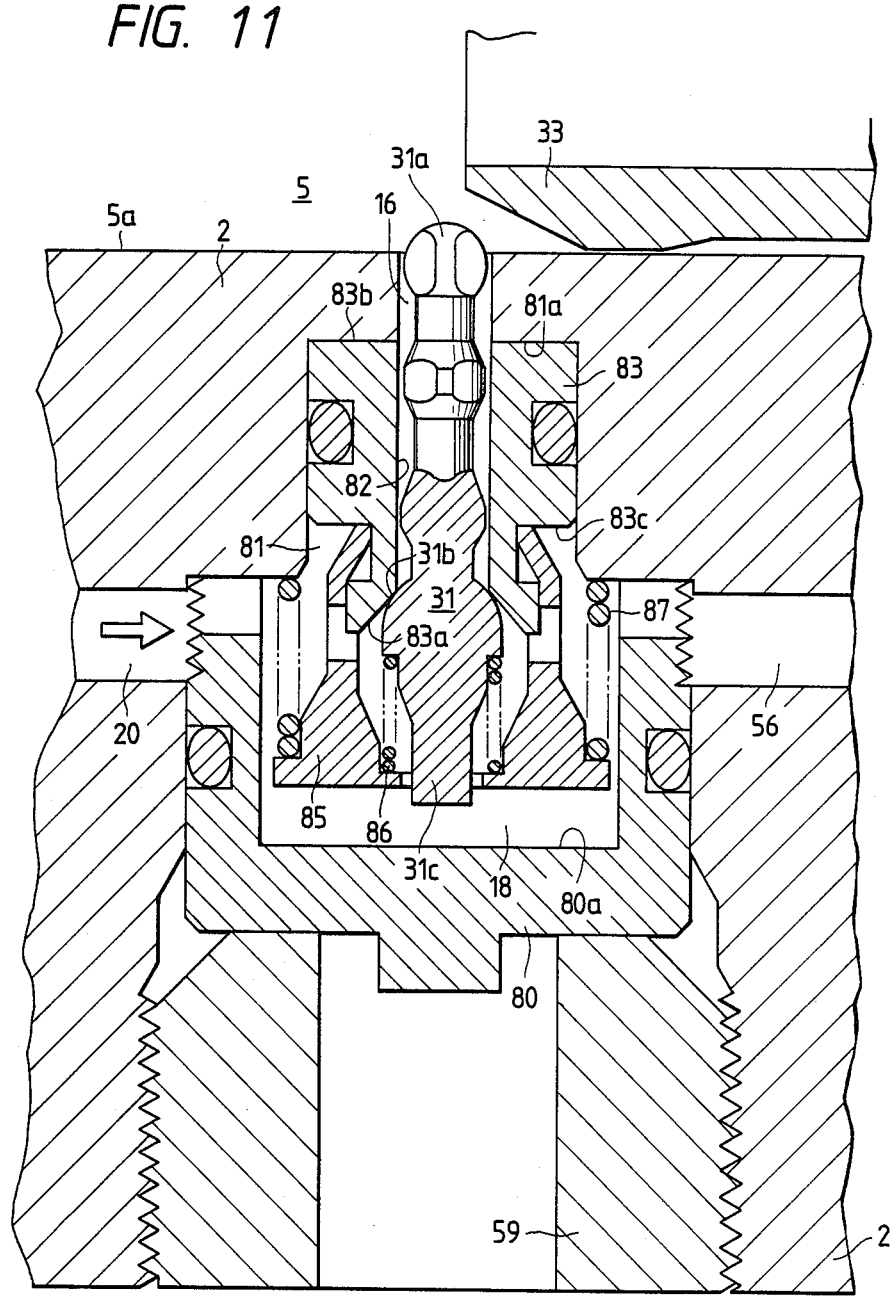
FIGS. 11 and 12 are views similar to FIG. 8, showing the operation of the valve mechanism.
Figure 12:
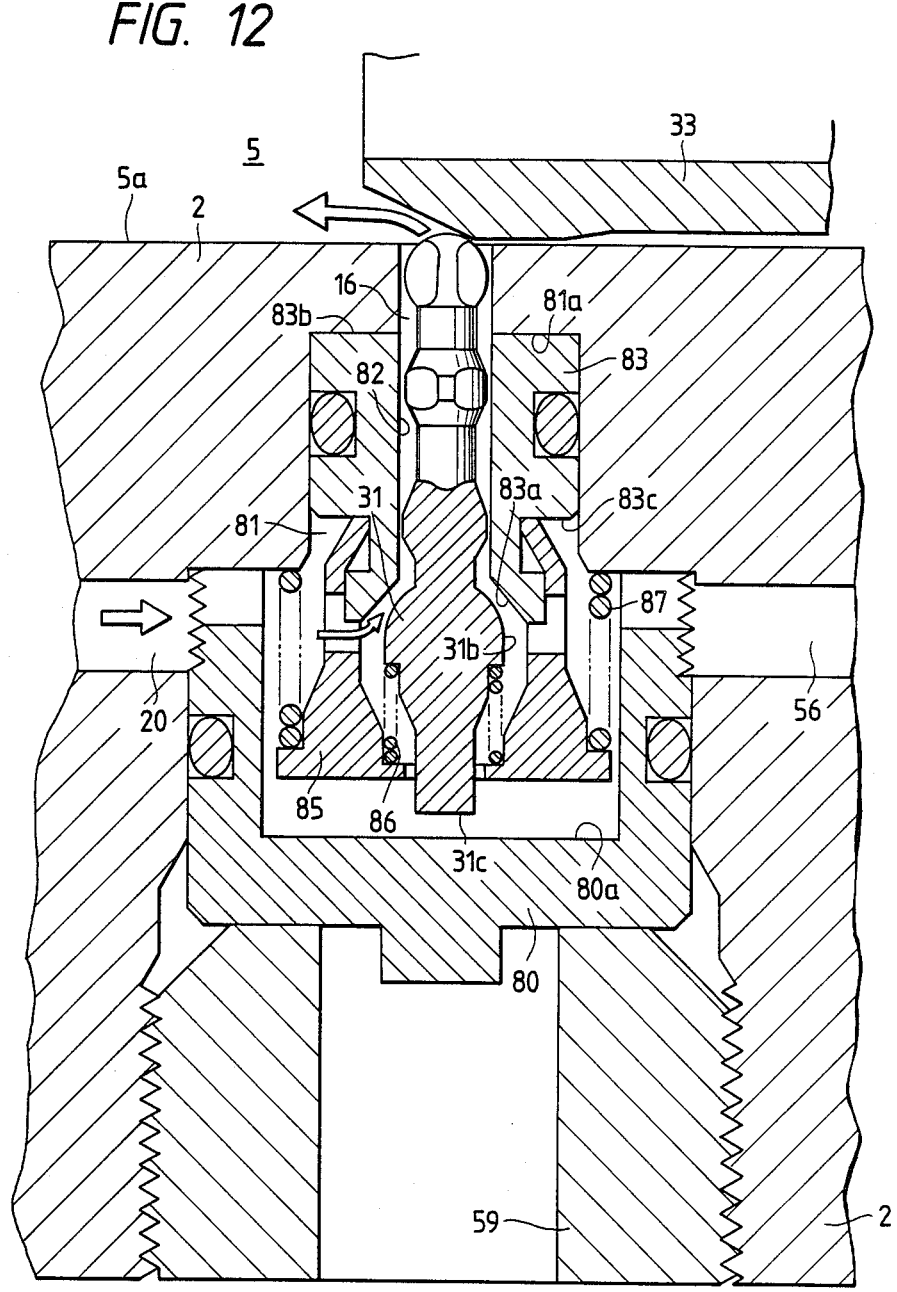

FIG. 11 shows that condition of the valve mechanism 26 when the anti-lock control or the traction control is started, so that the supply valve SV is opened, and the anti-lock valve ALV or the traction valve CV3 is closed to shut off the fluid passage connected to the reservoir 11. In this case, the brake fluid of higher pressure than the pressure in the fluid pressure chamber 5 is supplied from the accumulator 22 to the valve chamber 18 via the fluid passages 21 and 20. Therefore, the fluid pressure is applied to a face 83c of the piston 83 remote from the end face 83b, so that the piston 83 is moved toward the opening 16 against the bias of the set spring 87, with the valve portion 31b of the intake valve 31 held in contact with the valve seat 83a of the piston 83 under the influence of the check spring 86. This movement of piston 83 toward the opening 16 is stopped when the end face 83b of the piston 83 is brought into contact with the surface 81a of the piston chamber 81. In this condition, the front end 31a of the intake valve 31 is extended into the fluid pressure chamber 5. Therefore, when the primary piston 3 is moved in a left-hand direction (FIG. 7), the intake sleeve 33 is brought into engagement with the front end 31a of the intake valve 31 to push down the intake valve 31 against the bias of the check spring 86, as shown in FIG. 12. As a result, the valve portion 31b is brought out of engagement with the valve seat 83a of the piston 83 to thereby supply the high pressure brake fluid of the accumulator 22 to the fluid pressure chamber 5.

Figure 13:
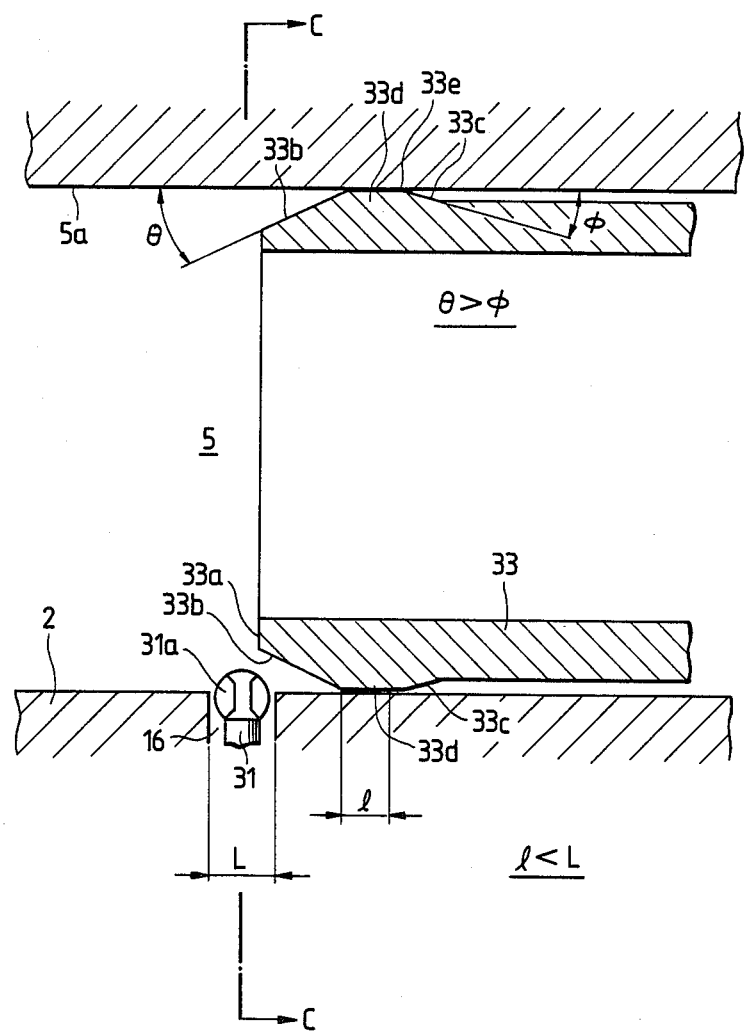
FIG. 13 is a fragmentary, cross-sectional view of the apparatus of FIG. 7, showing an intake sleeve.
Figure 14:
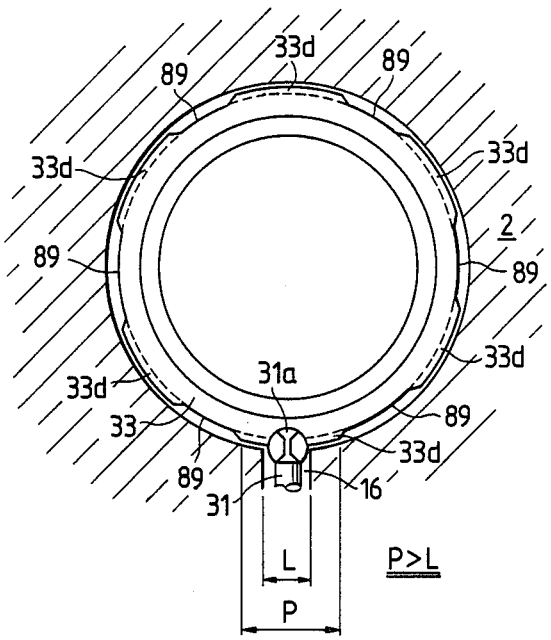
FIG. 14 is a cross-sectional view taken along the line C—C of FIG.

FIG. 13 shows a longitudinal cross-sectional view of a front portion of the intake sleeve 33 for operating the intake valve 31, and FIG. 14 shows a front end of the intake sleeve 33. When the intake sleeve 33 pushes down the intake valve 31, the intake sleeve 33 may sometimes be tilted because of a reaction force encountered and fail to move smoothly. In this embodiment, to prevent this, a plurality of support projections 33d are formed on the outer peripheral surface of the cylindrical intake sleeve 33 adjacent to its front end 33a in circumferentially spaced relation to one another. The support projections 33d are disposed in sliding contact with the cylindrical inner peripheral surface 5a of the fluid pressure chamber 5, and the support projections 33d cooperate with the inner peripheral surface 5a to provide a plurality of fluid passages 89. Each support projection 33d has a support surface 33e extending along a longitudinal axis of the intake sleeve 33 and held in sliding contact with the inner peripheral surface 5a of the fluid pressure chamber 5. An engaging surface 33b of each support projection 33d extends between the support surface 33e and front end 33a of the intake sleeve 33 and is tapered toward the front end 33a. The engaging surface 33b is inclined radially inwardly of the intake sleeve 33 at an angle of $\theta$ with respect to the longitudinal axis of the intake sleeve 33. The support projection 33d also has a rear surface 33c extending rearwardly from the support surface 33e, the rear surface 33c being tapered away from the support surface 33e and inclined radially inwardly of the intake sleeve 33 at an angle of $\phi$ with respect to the longitudinal axis of the intake sleeve 33 ($\theta > \phi$). The axial length l of the support surface 33e of each support projection 33d is shorter than the diameter L of the opening 16 of a circular cross-section in which the front end 31a of the intake valve 31 is received. And, the width P, that is, the circumferential dimension, of each of the support projection 33d is greater than the diameter L of the opening 16. With this arrangement, the intake sleeve 33 is prevented from being tilted upon engagement with the intake valve 31, and it is intended that the support projection 33d will not fully close the opening 16. The other valve mechanism 27 and the other intake sleeve 34 are identical in construction to the above-mentioned valve mechanism 26 and intake sleeve 33, respectively.

Figure 15:
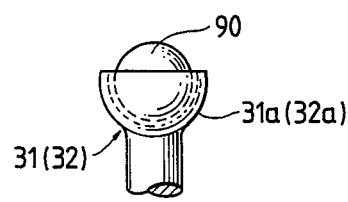
FIG. 15 is a side-elevational view of a portion of an intake valve according to a modified form of the invention.

FIG. 15 shows a fourth embodiment of the invention in which a steel ball or spherical member 90 is mounted in a front end 31a (32a) of each of intake valves 31 and 32 in such a manner that the steel ball 90 is freely rotatable with respect to the front end 31a (32a). With this construction, the intake valve 31 (32) can be more smoothly pushed down by the intake sleeve 33 (34), and in addition the front end 31a (32a) is prevented from being subjected to wear.

What is claimed is:

1. Apparatus for controlling brake fluid pressure of a vehicle comprising:
   (a) a master cylinder comprising a housing having at least one fluid pressure chamber therein, and at least one piston movably mounted within said housing so as to control fluid pressure within said fluid pressure chamber, said housing having a valve chamber which opens to said fluid pressure chamber;
   (b) a fluid pressure source for supplying brake fluid;
   (c) a reservoir for holding the brake fluid;
   (d) a wheel cylinder for applying a braking force to wheels of the vehicle;
   (e) a first fluid passage connecting said fluid pressure chamber to said wheel cylinder;
   (f) a hold valve provided in said first fluid passage so as to control fluid communication between said fluid pressure chamber and said wheel cylinder;
   (g) a second fluid passage connecting said wheel cylinder to said reservoir;
   (h) a decay valve provided in said second fluid passage so as to control fluid communication between said wheel cylinder and said reservoir;
   (i) a third fluid passage connecting said fluid pressure source to said fluid pressure chamber, said valve chamber being provided in said third fluid passage;
   (j) a supply valve provided in said third fluid passage between said valve chamber and said fluid pressure source so as to control the flow of the brake fluid from said fluid pressure source to said fluid pressure chamber;
   (k) at least one intake valve mounted in said valve chamber and normally held in its closed position to shut off said third fluid passage;
   (l) a valve operating member mounted on said piston for movement therewith, said valve operating member being engageable with said intake valve when the stroke of movement of said piston reaches a predetermined value to thereby move said intake valve to its open position.

2. Apparatus according to claim 1, wherein there are provided two said pistons spaced from each other in a direction of movement of said pistons, one of said two pistons being a primary piston while the other is a secondary piston, there being provided two said fluid pressure chambers one of which is a first fluid pressure chamber while the other is a second fluid pressure chamber, the fluid pressures within said first and second fluid pressure chambers being controlled by said primary and secondary pistons, respectively, and there being provided two said intake valves received respectively in two said valve chambers spaced from each other in the direction of movement of said primary and secondary pistons.

3. Apparatus according to claim 1, further comprising a bottoming switch which is actuated when the stroke of movement of said piston exceeds the predetermined value, said supply valve being responsive to the actuation of said bottoming switch so as to be opened.

4. Apparatus according to claim 1, wherein a one-way valve is provided for preventing the brake fluid from flowing from said fluid pressure chamber toward said fluid pressure source through said third fluid passage.

5. Apparatus according to claim 2, wherein an auxiliary piston is mounted around said primary piston and is operable to move said primary piston, an auxiliary fluid pressure chamber being provided within said housing, said auxiliary fluid chamber being connected to said fluid pressure source through a fourth fluid passage and also connected to said reservoir through a fifth fluid passage, the brake fluid within said auxiliary fluid pressure chamber acting on said auxiliary piston; a traction valve being provided in said fourth fluid passage and being operable to be opened when a slip of wheels of the vehicle reaches a predetermined level, thereby allowing the brake fluid to flow from said fluid pressure source to said auxiliary fluid chamber so as to increase the fluid pressure within said auxiliary fluid chamber; and a cut valve being provided in said fifth fluid passage and being operable to be closed when the slip of the wheels of the vehicle reaches the predetermined level, thereby interrupting the fluid communication between said auxiliary fluid chamber and said reservoir, whereby when said slip reaches said predetermined level, said auxiliary piston is moved to move said primary piston, thereby achieving a traction control.

6. Apparatus according to claim 1, wherein said valve chamber having an opening which opens to said fluid pressure chamber, said intake valve being engageable in said opening so as to shut off said third fluid passage.

7. Apparatus according to claim 1, wherein said valve chamber having an opening which opens to said fluid pressure chamber, one end of said intake valve being received in said opening, said intake valve having a valve portion, there being provided a valve piston mounted within said valve chamber and having a valve seat at one end thereof remote from said opening, said intake valve being movable relative to said valve piston, a first spring being provided for urging said valve seat into sealing engagement with said valve portion to shut off said third fluid passage, said valve piston being movable together with said intake valve between a first position where said one end of said intake valve is fully received in said opening and a second position where said one end of said intake valve projects into said fluid pressure chamber; said valve piston being held in said first position when said supply valve is in its closed condition; said valve piston being moved by the fluid pressure, supplied from said fluid pressure source, to said second position against the bias of said first spring when said supply valve is in its open condition; and in said second position of said valve piston, said valve operating member being engageable with said one end of said intake valve to move said intake valve relative to said piston to thereby disengage said valve portion of said intake valve from said valve seat of said valve piston to communicate said fluid pressure source with said fluid pressure chamber through said third passage.

8. Apparatus according to claim 7, wherein a second spring is provided for urging said valve portion of said intake valve into sealing engagement with said valve seat of said valve piston.

9. Apparatus according to claim 7, wherein there is provided a stop member, the other end of said intake valve being held against stop member when said valve piston is in said first position.

10. Apparatus according to claim 1, wherein said valve operating member is in the form of a sleeve, said sleeve being movable in a direction of a longitudinal axis thereof and having one end held against said piston, said sleeve having an inclined surface formed at its outer periphery at its other end, said inclined surface being inclined toward a center line of said sleeve, said inclined surface being engageable with one end of said intake valve projecting into said fluid pressure chamber.

11. Apparatus according to claim 10, wherein said sleeve has a support projection formed on tis outer periphery and having said inclined surface, said support projection having a support surface extending along the longitudinal axis thereof, said support surface being disposed axially adjacent to said inclined surface and being disposed in sliding contact with an inner peripheral surface of said fluid pressure chamber, said valve chamber having an opening of a circular cross-section which opens to said fluid pressure chamber, one end of said intake valve being received in said opening, the length of said support surface in the direction of the axis of said sleeve being less than the diameter of said opening.

12. Apparatus according to claim 11, wherein said support projection has a second inclined surface which is disposed axially adjacent to said support surface, said support surface being disposed between said first and second inclined surfaces, said second inclined surface being inclined toward the center line of said sleeve.

13. Apparatus according to claim 11, wherein there are provided a plurality of said support projections in peripherally spaced relation to one another, a plurality of fluid passages being defined by said plurality of support projections and the inner peripheral surface of said fluid pressure chamber.

14. Apparatus according to claim 7, wherein a spherical member is rotatably mounted on said one end of said intake valve, said valve operating member being engageable with said spherical member.

* * * * *